Figure 2A:
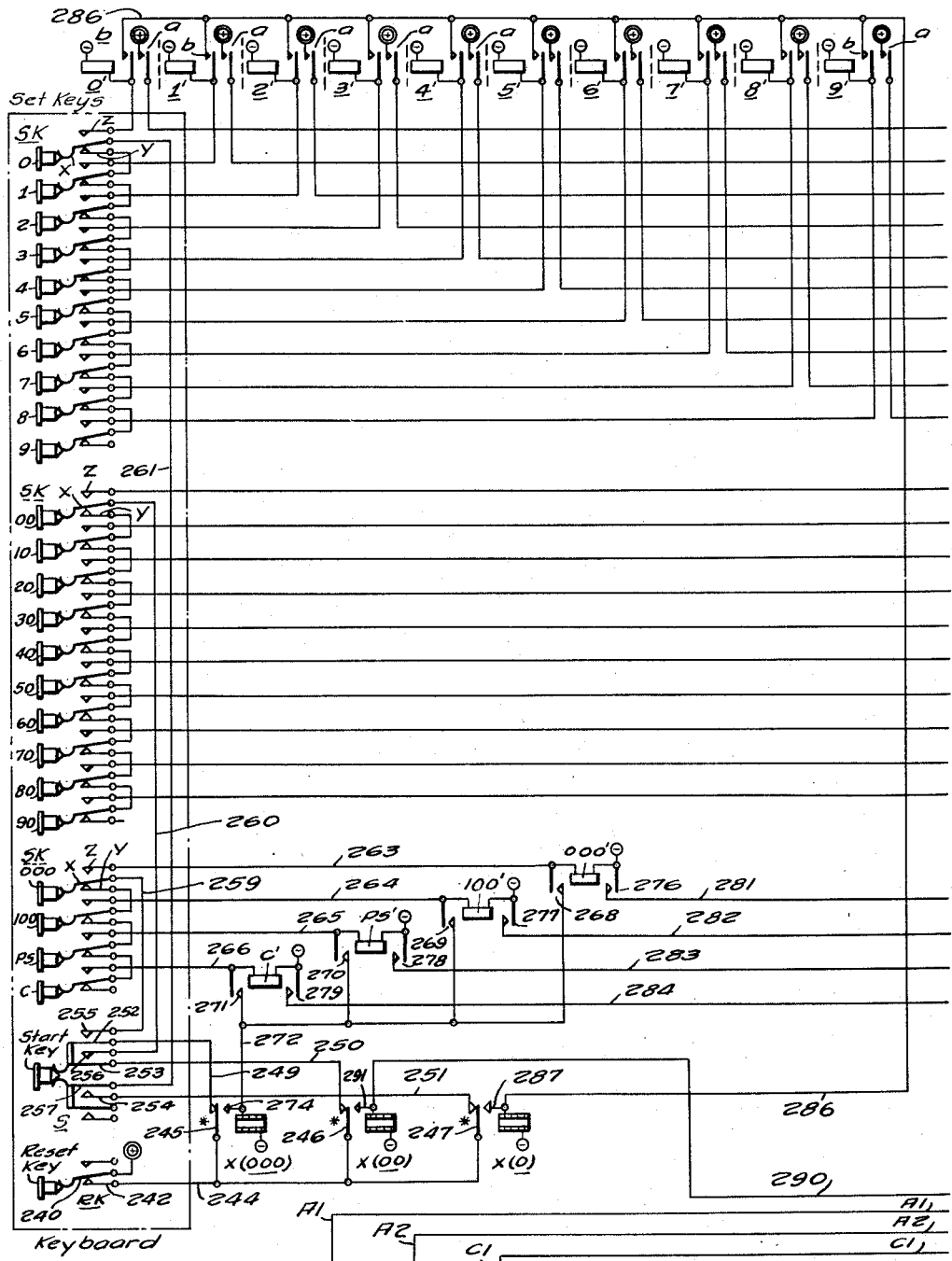

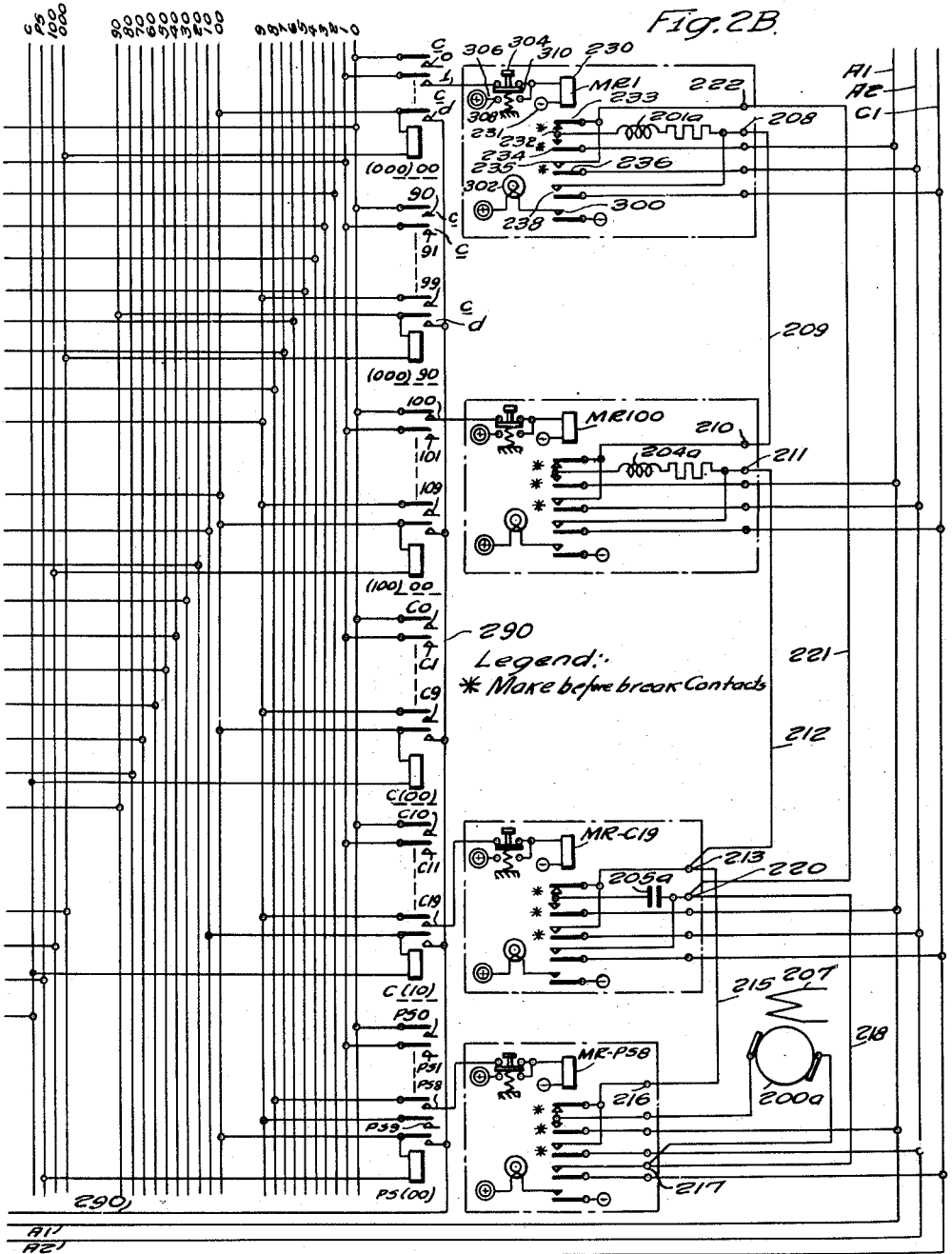

April 6, 1943. W. W. PARKER ET AL 2,315,649

SELECTIVE CIRCUIT METERING DEVICE

Filed Nov. 13, 1940 2 Sheets-Sheet 2

Legend:-
* Make before break Contact.

WITNESSES:

INVENTORS
William W. Parker &
Herbert P. Peters.
BY
ATTORNEY

Patented Apr. 6, 1943

2,315,649

UNITED STATES PATENT OFFICE 2,315,649

SELECTIVE CIRCUIT METERING DEVICE

William W. Parker, Irwin, and Herbert P. Peters, Forest Hills, Pa., assignors to Westinghouse Electric & Manufacturing Company, East Pittsburgh, Pa., a corporation of Pennsylvania Application November 13, 1940, Serial No. 365,504

5 Claims. (Cl. 171—97)

The present invention relates to calculators for electrical networks, and it has particular relation to a novel and improved arrangement for metering a miniature replica network.

As is well known, network calculators comprise power sources, condensers, and various electrical impedances connected to form a miniature network similar to and having electrical characteristics proportional to an actual or proposed fullsize electrical distribution system or network. The purpose of such calculators is to permit the study in the laboratory of the characteristics and behavior of the actual network which frequently is too complicated to be analyzed thoroughly by purely mathematical means in any reasonable length of time.

After the power sources and impedances are electrically connected with the various units thereof having characteristics proportional to those of the generating equipment, lines, loads, synchronous condensers, etc., of the actual circuit, the analysis is carried out by measuring the current and voltage values and relationships of the various portions of the miniature network under various conditions. It is necessary to connect a set of meters such as an ammeter, a voltmeter and a wattmeter to each of the various circuit portions in rapid succession. Because the number of such network portions or circuits which must be metered is frequently as great as 300 or more, it is particularly desirable to provide some means for expediting the interconnection of these circuits to the metering equipment.

In the past, two methods have been used for connecting the meters to the desired circuits. In one of these methods a conducting cord having a three-way plug on each end is used to connect the circuit to be metered to a three conductor metering bus which extends the full length of the calculator. This method is subject to the objection that the metering plug must be manually connected to each circuit as it is to be metered. For efficient operation of a calculator with such a circuit, it is thus necessary to have two operators, one to read the meter and another to change the metering plug.

Another circuit selecting scheme requires the use of one telephone-type key for each circuit to be metered. These keys are mounted in a group before the operator and are wired directly to the circuits. This method is limited because these keys can be used only with low voltages and small currents. In addition, this system of circuit selection requires that at least three leads be carried from each circuit to the keys on the metering desk. A calculator having, for instance, 300 circuits would require at least 900 leads from the circuit cabinet to the metering desk. These leads are necessarily of such length as to have an appreciable capacitive coupling and impedance and are a source of error in the readings. Another objection to this scheme is that it cannot be readily interlocked with the result that it is possible to close two keys at one time and thus cause erroneous readings and possibly blowing of fuses.

The present invention relates to a circuit selecting scheme which lacks the limitations of these prior art arrangements and permits the selecting of any circuit from one central point without requiring that individual sets of leads be brought from each circuit of the network to the selecting point which is preferably at the metering table. This scheme comprises a keyboard having a number of groups of keys, circuit selecting relays, and a metering relay for each circuit. The first group of keys selects a group of relays, a second group of keys selects a smaller number of circuits from the first group while a third set of keys selects a single circuit from this latter group. Upon actuation of a "start" key, this selected circuit is connected to the metering bus or conductors.

It is, accordingly, an object of the present invention to produce a novel and improved electrical network calculator.

Another object of the invention is to provide a novel and improved circuit selecting circuit for use with an electrical network calculator.

A further object of the invention is to provide a supervised selective scheme for metering the various portions or circuits of a network calculator with greater speed and convenience and improved accuracy over the prior art.

Other objects and advantages of the invention will appear from the following detailed description read in conjunction with the accompanying drawings, in which:

Figure 1 is a wiring diagram representing a portion of an electrical distribution or transmission network which it is desired to analyze by means of a network calculator, and Figs. 2A and 2B provide a schematic diagram of the present invention applied to a miniature network set up for analyzing the network shown in Fig. 1.

In Fig. 1 of the drawings is shown a portion of an electrical network comprising a generator 200 which is connected to supply an electrical load 201 through a pair of conductors 202 and 203. An impedance 204 represents the impedance of the transmission line while a capacitor 205 represents the capacitance thereof. The conductors 206 represent other transmission lines which go to make up a transmission network which it is desired to analyze. It will be understood that this network will generally comprise a great number of circuits including more loads as well as generators, synchronous condensers, etc., and these additional elements are not shown in the drawings in order to simplify the description of the invention.

In solving the circuit, the entire network is first set up on the calculating board using power sources, impedances and condensers proportional to the known characteristics of the actual network. For the sake of simplicity, only the portions of this network shown in Fig. 1 are shown set up on the calculator board in Fig. 2B. Thus the impedance 201a is proportional to and has the same power factor as the load 201, while the impedance 204a, condenser 205a and generator 200a represent the line impedance 204, capacitor 205, and generator 200, respectively, and are proportional to their values. The generator 200a has associated therewith a properly energized field winding 207 although some other suitable power source may be substituted for the generator if desired. A terminal 208 of the impedance 201a is connected by a conductor 209 to a terminal 210 of the impedance 204a while a terminal 211 at the other end of this impedance is connected by a conductor 212 to a terminal 213 of the condenser 205a. A conductor 215 extends from the terminal 213 to a terminal 216 connected to the generator 200a. Another terminal 217 of this generator is electrically connected by means of a conductor 218 which engages terminal 220 connected to the end of condenser 205a opposite the terminal 213. A conductor 221 extends from terminal 220 to terminal 222 of the load 201a. It will thus be evident that these representative impedances are connected similarly to the actual network in Fig. 1.

Conductor buses designated as A1, A2, and C1 extend throughout the calculator board for connecting selected circuit portions to the measuring equipment. The conductors A1 and A2 are adapted to be connected directly in series with the circuit portion to be energized in accordance with the current therethrough, while the conductor C1 is to be connected to the other side of the circuit to cooperate with A1 or A2 to supply an indication of the voltage thereacross. This connection is made by a series of measuring relays designated by the characters MR followed by the number of the circuit which it controls. Thus, the impedance 201a is connected as circuit 1 and is controlled by relay MR1. The condenser 205a is connected to the board as circuit C19 and is controlled by relay MR—C19, while the power source 200a is connected as circuit PS8 and consequently is controlled by metering relay MR—PS8. While only four such relays are shown for simplicity, it will be understood that the number actually provided will depend upon the number of circuits which the calculator is adapted to provide. In the case shown in the drawings, the selecting system will handle 400 circuits and an equal number of relays may be provided. These relays will be numbered from MR0 to MR199, MR—C0 to MR—C99, and MR—PS0 to MR—PS99, inclusive.

The relay MR1, for example, includes a normally unenergized coil 230 which is connected at 231 to the negative terminal of a control power source (not shown) which may be a storage (48 volt) battery or rectox unit. A movable contact 233 is normally in engagement with a stationary contact 232 in series with the impedance 201a and its terminals 208 and 220. A movable contact 234 is connected to the metering conductor A1 and is disposed to engage the lower end of the stationary contact 232 upon energization of the coil 230. Another stationary contact 235 is connected to the terminal 222 of the impedance 201a and is disposed to be engaged by a movable contact 236 connected to the conductor A2. A pair of normally open contacts 238 are provided to connect the impedance terminal 208 to the third metering bus C1 upon energization of the relay coil.

It will appear from the above that energization of the coil 230 will place the conductors A1 and A2 in series with the impedance in a circuit as follows: Terminal 222, contacts 235 and 236, bus A2, bus A1, movable contact 234, stationary contact 232, impedance 201a, and terminal 208. At the same time the conductor C1 is connected to terminal 208 through contacts 238. The contacts in the current circuit have make before break properties as indicated in the drawings and consequently there is no possibility of the network circuit being broken and causing disturbance.

In order to selectively energize these metering relays, a plurality of set keys are arranged in three groups at a single control board or location. The first group includes four keys designated by SK000, SK100, SK—PS, in which the "PS" indicates "power supply," and SPK—C, wherein the "C" indicates "condenser." While these latter designations are purely arbitrary, it is preferred to connect all of the power sources through the same control key and all of the condensers through another such key. The second group of keys are designated as SK00, SK10, and so on to SK90. Units are represented by the third group of keys which are thus indicated by SK0 to SK9, inclusive. It will be understood that more or fewer than four keys may be provided in the first group if desired.

Each of these set keys has three contact members associated therewith. A movable contact $x$ is normally in engagement with a break contact $y$ but separates therefrom upon actuation of the set key to engage a make contact $z$.

A reset key RK which is of the non-locking type controls the position of a movable key 240 connected to the positive side of the control power supply (not shown) and normally in engagement with a stationary contact 242. This stationary contact is connected by a conductor 244 to movable contacts 245, 246 and 247 which are associated with guard relays $\overline{X(000)}$, $\overline{X(00)}$, and $\overline{X(0)}$ respectively. These relays are normally unenergized and are of the slow drop-out type. With the relays unenergized, the movable contacts 245, 246 and 247 are connected by conductors 249, 250 and 251 to contacts 252, 253, 254, respectively, of a start key S.

The start key is also of the non-locking type and cooperates with contacts 255, 256 and 257 which are adapted to be engaged by the contacts 252, 253 and 254, respectively, when the key is actuated. A conductor 259 extends from the contact 255 to the movable contact $x$ cooperating with SK000. The break contacts $y$ and movable contacts $x$ of the set keys in this first group from SK000 to SK—C are connected in series arrangement so that all of the movable contacts of the group are electrically connected to the conductor 259 when the set keys are in their normal position. In like manner a conductor 260 connects the contact 256 to each of the movable contacts $x$ operated by the second group of set keys SK00 to SK90, and a conductor 261 connects the contact 257 to all of the movable contacts associated with SK0 and SK9.

The make contacts $z$ of the set keys SK00, SK100, SK—PS and SK—C are electrically connected to the operating coils of relays 000′, 100′, PS′, and C′ by conductors 263, 264, 265 and 266, respectively. The other terminals of these operating coils are connected to the ground of the control voltage supply as shown. Associated with each of these relays is a pair of normally open contacts, at 268, 269, 270 and 271. One of each of these sets of contacts is connected to a conductor 272 which terminates at the positive terminal of the relay X(000) and a contact 274. The other end of this latter relay is grounded as shown, and the contact 274 is disposed to be engaged by the movable contact 245 when the relay coil is energized. Normally open contacts 276, 277, 278 and 279 are also disposed for operation by the relays 000′, 100′, PS′, and C′, respectively. One of the contacts of each of these sets is connected to ground. The other contacts are connected by means of conductors 281, 282, 283, and 284, respectively to control conductor buses 000, 100, PS, and C.

The make contacts $z$ cooperating with each of the second group of set keys SK00 to SK90 are each connected to correspondingly numbered control buses 00, 10, etc., to 90. Thus, the contact of SK00 is connected to the bus 00, and the contact of SK90, for example, is connected to the bus 90.

The make contacts of the set keys SK0 to SK9 of the third or unit group are each connected to an operating coil of a corresponding relay designated as 0′ to 9′, inclusive. The other end of each of these operating coils is connected to the ground of the control voltage supply, as shown. A set of normally open contacts, designated as $a$, is operatively associated with each of these relays and arranged to connect the positive side of the control power supply to a correspondingly numbered bus in a group numbered 0 to 9, inclusive, when the relay is energized. A second set of normally open contacts $b$ is likewise associated with each of these relays to connect the positive side of the corresponding relay to a conductor 286 which extends to the positive side of the energizing coil of the guard relay X(0). The conductor 286 is also connected to a contact 287 which is disposed for engagement by the movable contact 247 when this relay is energized to form a holding circuit for the selected relay in the group 0′ to 9′, inclusive.

A plurality of relays designated as (000)00, (000)10, (000)20, etc., to (000)90 (only 2 of which are shown) are connected to the 000 bus and to the corresponding conductor in the second group of buses such as 00, 10, 20, etc., to 90. In like manner a group of 10 relays designated as (100)00, (100)10, etc. are connected between the control bus 100 and the same buses of the second group while relays PS00 to PS90 and C00 to C90 are connected in a similar manner between the buses PS and C and the second group of control buses.

Associated with each of these latter relays, as for example, relay (000)00 are ten normally open contacts designated as $c$ and another normally open pair of contacts designated as $d$. One contact of each of these pairs $d$ is connected to the second group of control bus sides of the relay coil as bus 00. The other contact of the set $d$ is connected to a conductor 290 which extends to the positive terminal of the guard relay X(00). This conductor also is connected to a contact 291 which is disposed to be engaged by the contact 246 to form a holding circuit for the corresponding relay (000)00.

The contacts $c$ associated with the relay (000)00 are connected at one end to the third group of control buses designated as 0 to 9, and at the other end to leads to the metering relays MR0 to MR9, inclusive. The other relays in the group including (000)00 likewise control circuits between the third group of control buses and the metering relays controlling the other calculator network circuits. It will be understood that a large number of the above described relays and contacts have been omitted in order to simplify the drawings and explanation.

The relay MR1 which controls the connections of the calculator impedance 201a to the metering buses A1, A2 and C1 is shown connected to have its energization controlled through the relays (000)00 and 1′. The relay MR100 is connected to be energized through the control of relays (100)00 and 0′. Relays MR—C19 and MR—PS8 are arranged to be energized in a similar manner as calculator circuits C19 and PS8. Thus relay MR—619 is selected by actuating keys SK—C, SK10 and SK9.

A set of measuring instruments including an ammeter A, voltmeter V and wattmeter W are preferably located near the board on which the various groups of set keys are disposed. The ammeter and current coil of the wattmeter are connected across the metering buses A1 and A2, while the voltmeter and voltage coil of the wattmeter are connected between the conductor C1 and one of the current buses.

With the complete network to be analyzed set up on the calculator, the first step in metering the load impedance 201a is to actuate the set keys SK000, SK00, and SK1. The relay 000′ will then be connected from its minus terminal through the conductor 263, the contacts $z$ and $x$ of SK000, and conductor 259 to the contact 255 of the start key. The control bus 00 is connected to the make and movable contacts of SK00 to the terminal 256 of the start key SK. The operation of SK1 connects the relay 1′ from negative to the start key contact 257 through conductor 261. Upon operation of the start key the contacts 255, 256 and 257 are connected to the positive terminal of the control voltage source through conductor 249, contact 245 of relay X(000), conductor 244 and the reset key RK. As a result the relays 000′ and 1′ are energized and the control bus 00 is connected to positive. Energization of the relay 000′ closes the contacts 276 to negatively energize the control bus 000 through the conductor 281 and at the same time energizes the guard relay X(000) through its other contacts and the conductor 272. Operation of relay X(000) in turn causes the contact 245 to engage contact 274 to form a holding circuit for relay 000′. Subsequent to this operation the circuit to the 000 group of set keys from the positive terminal through the reset key RK is broken by the make before break contact 245.

Energization of the relay 1′ closes the contacts b to energize the guard relay X(0) through the conductor 286 while the contact 247 engages contact 287 to form a holding circuit for the relay 1'. After this holding circuit is made, the positive energization of the 0 group of set keys is interrupted. By closing the a contacts associated therewith the relay 1 also connects the control bus 1 to positive.

While the start key is depressed the 000 bus is thus connected to negative and the 00 bus is connected to positive so that the relay (000)00 which is connected to these buses is energized. As a result, the ten c contacts and the single d contact which are operatively associated therewith are closed. The closure of the d contact closes a circuit from the 00 bus through the conductor 290 to energize the guard relay X(00). This results in the contact 246 engaging the contact 291 to form a holding circuit for relays X(00) and (000)00.

Closure of the c contacts associated with relay (000)00 causes connection of all of the metering relay circuits in this group to the corresponding buses in the group 0 to 9. Since only the number 1 bus is energized, however, only relay MR1 is connected to positive and energized. This energization connects the metering buses A1 and A2 in series with the impedance 201a and connects the bus C1 to the opposite end thereof as previously described. Thus, the ammeter V, voltmeter V and wattmeter W are energized to indicate the current, voltage and power of this circuit portion.

Since all of the holding circuits extend through the reset key RK, momentary depression thereof will result in deenergizing the relays and placing the entire system in its original condition. Electrical or mechanical means of a known type may be provided for clearing the selection board and restoring the set keys to their original position.

The impedance 204a may be metered by depressing set keys SK100, SK00, and SK0 to select calculator circuit 100. Circuit C19 is selected by depressing keys SK—C, SK10 and SK9 to meter the condenser 205a. By depressing keys SK—PS, SK00 and SK8, the generator 200a which is connected to the calculator as circuit PS8 is metered through the instruments.

As is shown, for example, in conjunction with relay MR1, each of the metering relays is provided with an additional set of normally open contacts 300 which are connected in series with an indicating lamp 302 and a power supply. These contacts are closed when the relay coil is energized and thus the lamp indicates that the circuit is being metered. Preferably these lamps are all grouped near the control table in a predetermined arrangement so that the operator may tell at a glance just which of the calculator circuits is connected to the metering buses at any time.

It is also preferred to provide each metering relay with means for manually energizing it if desired. Thus, a push button 304 is provided with MR1. This arrangement includes a conductor 306 connected from the positive terminal to the operating coil 230 through a normally open switch 308 which is closed when the push button 304 is depressed. Depression of this button also opens the circuit to the selective system through the movable contact 310.

It will appear that the invention permits the selection of any circuit from a central location without the necessity of providing leads from each circuit to that location. All that is necessary is a three wire metering bus extending around the calculator and these bus conductors may conveniently be of such size as to add substantially no impedance to the network. The method employed for connecting the keys and sealing in the relays reduces the possibility of a wrong selection and makes it impossible to short circuit the apparatus or of connecting more than one circuit to the metering buses at a single time. The simple keyboard, as contrasted with one key for each circuit, results in a large saving of time. Only a small amount of power is required for operating the selector.

Since various modifications may be made in the apparatus shown without departing from the spirit and scope of the invention, it is intended that the invention shall be limited only by the following claims interpreted in view of the prior art.

We claim as our invention:

1. In combination with a calculator device for studying the performance of an electrical system, said device including impedance elements and a power supply for connection to represent an electrical system to be studied, electrical measuring equipment, a set of conducting buses connected to said measuring equipment to transmit energy thereto and extending to said calculator device, a plurality of relays for directly connecting various elements of said device to said conducting buses to energize said measuring equipment in accordance with the electrical characteristics thereof, and means operable from a location adjacent said measuring equipment for selectively energizing and deenergizing said relays to select the elements of said device for measuring.

2. In combination with a calculator device for studying the performance of an electrical system, said device including impedance elements and a power supply for connection to represent an electrical system to be studied, a set of measuring instruments responsive to the current and voltage impressed thereon, a set of conducting buses extending from said instruments to said calculator device, means connecting said buses to said instruments, a plurality of relays each of which is energizable to connect said buses to a corresponding portion of said device for energization in accordance with the current and voltage characteristics thereof, and means operable from a location adjacent said instruments for selectively energizing and deenergizing said relays to select the elements of said device for measurement.

3. In combination with a calculator device for studying the performance of an electrical system, said device including lumped impedance elements and a power supply for connection to represent an electrical system to be studied, a set of instruments including a voltmeter, an ammeter and a wattmeter, a set of three conductor buses extending from said instruments to said calculator device, means connecting said instruments to said buses to indicate their corresponding quantities when a quantity proportional to the voltage is connected to a first and second of said buses and a quantity proportional to the current is impressed across the second and third of said buses, a plurality of relays each of which when energized connects the second and third of said buses in series with one of the elements of said device and the first and second of said buses across said element, and means operable from a location adjacent said instruments for selectively energizing and deenergizing said relays to select the elements of said device for measuring.

4. In combination with a calculator device for studying the performance of an electrical system, said device including impedance elements and a power supply for connection to represent an electrical system to be studied, electrical measuring equipment, a group of conducting buses connected to said measuring equipment and extending to said device, a plurality of relays for connecting various portions of said device to said conducting buses, an energizing circuit for each of said connecting relays including two sets of normally open contacts connected in series circuit to control the continuity thereof, a plurality of control relays each of which is adapted to close one of said sets of contacts in each of a predetermined plurality of different said energizing circuits upon its being energized, means for energizing a selected one of said control relays, and means for closing the other said set of contacts in a selected one of said energizing circuits controlled by the selected control relay for energizing a predetermined connecting relay to connect the corresponding portion of said device to said conducting buses.

5. In combination with a calculator device for studying the performance of an electrical system, said device including impedance elements and a power supply for connection to represent an electrical system to be studied, electrical measuring equipment, a group of conducting buses connected to said measuring equipment and extending to said device, a plurality of relays for connecting different portions of said device to said conducting buses, an energizing circuit for each of said connecting relays including two sets of normally open contacts connected in series circuit to control the continuity thereof, a plurality of control relays each of which is designed to close one of said sets of contacts in each of a predetermined plurality of said energizing circuits upon its being energized, means for selecting one of said control relays for energization, a second set of control relays for closing the other said sets of contacts of a predetermined one of said energizing circuits in each group controlled by each of said first control relays, means for selecting one of said second group of control relays for energization, means for initially energizing said selected control relays through said selecting means to energize a corresponding connecting relay and for holding said energized control relays in energized condition independent of said selecting means, and means for disconnecting said holding means to deenergize the selected connecting relay and place the apparatus in condition for the selection of another portion of said device for measurement.

WILLIAM W. PARKER.
HERBERT P. PETERS.